(12) United States Patent
Sakai et al.

(10) Patent No.: US 6,998,821 B2
(45) Date of Patent: *Feb. 14, 2006

(54) UNINTERRUPTIBLE POWER SUPPLY

(75) Inventors: Hirotaka Sakai, Kawasaki (JP); Hideki Miyamoto, Takasaki (JP); Yasushi Mori, Takasaki (JP); Yukinori Akamoto, Inba-gun (JP); Nobuo Shiojima, Nakano-ku (JP)

(73) Assignee: Toshiba Battery Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/873,133

(22) Filed: Jun. 23, 2004

(65) Prior Publication Data

US 2004/0232885 A1   Nov. 25, 2004

Related U.S. Application Data

(63) Continuation of application No. 09/955,101, filed on Sep. 19, 2001, now Pat. No. 6,784,641.

(30) Foreign Application Priority Data

| Sep. 20, 2000 | (JP) | ............................. 2000-285961 |
| Sep. 20, 2000 | (JP) | ............................. 2000-285962 |
| Sep. 20, 2000 | (JP) | ............................. 2000-285963 |
| Sep. 20, 2000 | (JP) | ............................. 2000-285964 |
| Oct. 2, 2000  | (JP) | ............................. 2000-302246 |
| Nov. 14, 2000 | (JP) | ............................. 2000-347093 |
| Dec. 19, 2000 | (JP) | ............................. 2000-385210 |
| Dec. 19, 2000 | (JP) | ............................. 2000-385211 |

(51) Int. Cl.
   *H02J 7/04* (2006.01)
(52) U.S. Cl. .................................................. 320/138

(58) Field of Classification Search ................ 320/138, 320/106, 128; 361/103, 684; 340/568.3; 702/63
See application file for complete search history.

(56) References Cited

U.S. PATENT DOCUMENTS

| 4,719,550 A |   | 1/1988  | Powell et al. ................... 363/37 |
| 4,985,695 A | * | 1/1991  | Wilkinson et al. ......... 340/568.3 |
| 5,315,228 A | * | 5/1994  | Hess et al. .................... 320/106 |
| 5,606,242 A | * | 2/1997  | Hull et al. ..................... 320/106 |
| 5,631,800 A | * | 5/1997  | Jin et al. ....................... 361/103 |
| 5,633,573 A | * | 5/1997  | van Phuoc et al. .......... 320/128 |
| 5,661,463 A |   | 8/1997  | Letchak et al. ......... 340/636.15 |
| 5,825,156 A | * | 10/1998 | Patillon et al. ................ 702/63 |
| 6,018,456 A | * | 1/2000  | Young et al. ................ 361/684 |

\* cited by examiner

*Primary Examiner*—Pia Tibbits
(74) *Attorney, Agent, or Firm*—Oblon, Spivak, McClelland, Maier & Neustadt, P.C.

(57) ABSTRACT

An uninterruptible power supply comprises a power supply unit for generating DC power at a predetermined voltage from AC power supplied from the outside to supply the DC power to an electronic device, and a rechargeable battery unit including rechargeable battery cells for storing the power supplied thereto from the power supply unit for supplying the electronic device with the power stored in the rechargeable battery upon service interruption of the AC power. Particularly, the rechargeable battery unit comprises a battery state monitoring unit for monitoring a state of the rechargeable battery cells, and communicating means for notifying the electronic device of information indicative of the state of the rechargeable battery detected by the battery state monitoring unit, thereby securely guaranteeing the operation of the electronic device upon power failure, and sufficiently improve the operational reliability of the entire system.

11 Claims, 7 Drawing Sheets

| | CHARGE LEVEL | DISPLAY |
|---|---|---|
| CHARGE | 0% < Cap ≤ 20% | ■ ■ □ □ □ □  □ |
| | 20% < Cap ≤ 40% | ■ ■ ■ □ □ □  □ |
| | 40% < Cap ≤ 60% | ■ ■ ■ ■ □ □  □ |
| | 60% < Cap ≤ 80% | ■ ■ ■ ■ ■ □  □ |
| | 80% < Cap < 100% | ■ ■ ■ ■ ■ ■  □ |
| | Cap = 100% | □ ■ ■ ■ ■ ■  □ |
| DISCHARGE | Cap = 100% | □ ■ ■ ■ ■ ■  □ |
| | 80% < Cap < 100% | ▨ ■ ■ ■ ■ ■  □ |
| | 60% < Cap ≤ 80% | ▨ ■ ■ ■ ■ □  □ |
| | 40% < Cap ≤ 60% | ▨ ■ ■ ■ □ □  □ |
| | 20% < Cap ≤ 40% | ▨ ■ ■ □ □ □  □ |
| | 0% < Cap ≤ 20% | ▨ ■ □ □ □ □  □ |

□ UNLIT
■ LIT
▨ ■ LIT IN DIFFERENT COLOR FROM (THE BLACK RECTANGLE)

FIG. 10

| | CHARGE LEVEL | DISPLAY |
|---|---|---|
| CHARGE | 0% < Cap ≤ 20% | ■ ⊠ ☐ ☐ ☐ ☐ ☐ |
| | 20% < Cap ≤ 40% | ■ ■ ⊠ ☐ ☐ ☐ ☐ |
| | 40% < Cap ≤ 60% | ■ ■ ■ ⊠ ☐ ☐ ☐ |
| | 60% < Cap ≤ 80% | ■ ■ ■ ■ ⊠ ☐ ☐ |
| | 80% < Cap < 100% | ■ ■ ■ ■ ■ ⊠ ☐ |
| | Cap = 100% | ☐ ■ ■ ■ ■ ■ ☐ |
| DISCHARGE | Cap = 100% | ☐ ■ ■ ■ ■ ■ ☐ |
| | 80% < Cap < 100% | ⊠ ⊠ ⊠ ⊠ ⊠ ⊠ ☐ |
| | 60% < Cap ≤ 80% | ⊠ ⊠ ⊠ ⊠ ⊠ ☐ ☐ |
| | 40% < Cap ≤ 60% | ⊠ ⊠ ⊠ ⊠ ☐ ☐ ☐ |
| | 20% < Cap ≤ 40% | ⊠ ⊠ ⊠ ☐ ☐ ☐ ☐ |
| | 0% < Cap ≤ 20% | ⊠ ⊠ ☐ ☐ ☐ ☐ ☐ |

☐ UNLIT
■ LIT
⊠ BLINK
⊠ ■ LIT IN DIFFERENT COLOR FROM (THE BLACK RECTANGLE)

UNINTERRUPTIBLE POWER SUPPLY

CROSS-REFERENCE TO RELATED APPLICATIONS

This application is a Continuation of U.S. patent application Ser. No. 09/955,101, filed Sep. 19, 2001, now U.S. Pat. No. 6,784,641 and is based upon and claims the benefit of priority from the following Japanese Patent Applications: No. 2000-285961, filed Sep. 20, 2000, No. 2000-285962, filed Sep. 20, 2000, No. 2000-285963, filed Sept. 20, 2000, No. 2000-285964, filed Sep. 20, 2000, No. 2000-302246, filed Oct. 2, 2000, No. 2000- 347093, filed Nov. 14, 2000, No. 2000-385210, filed Dec. 19, 2000, and No. 2000-385211, filed Dec. 19, 2000.

BACKGROUND OF THE INVENTION

1. Field of the Invention

The present invention relates to an uninterruptible power supply which is suitable for ensuring that electronic devices such as a computer and a server operate continuously upon failure of a commercial (AC) power supply which serves as a power source for the electronic devices.

2. Description of the Prior Art

With the proliferation of OA (office automation), there is an increasingly higher need for integration of a variety of information (data). To respond to this need, an uninterruptible power supply is provided in order to ensure the operation of an electronic device such as a computer used as an information processing apparatus and a controller in a variety of applications or a peripheral device associated therewith, or such as a server for holding or controlling data in a network system. The uninterruptible power supply is disposed between an associated electronic device and a commercial (AC) power supply, which serves as a power source for the electronic device, such that the uninterruptible power supply powers the electronic device when the commercial power supply fails.

For reference, the uninterruptible power supply is configured to charge its rechargeable battery cells for storing electric energy therein in a normal state, and to retrieve the electric energy from the rechargeable battery cells for powering the electronic device when the commercial power supply fails.

However, since a lead rechargeable battery is typically used as a rechargeable battery cell, conventional uninterruptible power supplies generally become inevitably large and heavy. In addition, the lead rechargeable battery has several problems remained unsolved from an environmental point of view, such as its short lifetime, danger of leaking, and so on, for use as a rechargeable battery cell which is incorporated in an uninterruptible power supply. Also, a conventional uninterruptible power supply operates independently of an associated electronic device, and only powers a power supply unit of the electronic device upon power failure, so that the electronic device cannot detect the state of the rechargeable battery cell in the uninterruptible power supply such as a charge energy, lifetime and so on.

SUMMARY OF THE INVENTION

It is an object of the present invention to provide a simple and compact uninterruptible power supply which is capable of ensuring the operation of an electronic device while monitoring the state of a rechargeable battery.

It is another object of the present invention to provide an uninterruptible power supply which is capable of indicating to an electronic device and/or a user of the electronic device, a charging state of a rechargeable battery which is normally charged by the power from a commercial power supply and is responsible for powering the electronic device to ensure the operation of the electronic device when the commercial power supply fails.

It is a further object of the present invention to provide an uninterruptible power supply which is capable of ensuring a stable operation of the rechargeable battery.

An uninterruptible power supply according to the present invention comprises a power supply unit for generating DC power at a predetermined voltage from AC power supplied from the outside to supply the DC power to an electronic device, and a rechargeable battery unit including rechargeable battery cells for storing the power supplied thereto from the power supply unit for supplying the electronic device with the power stored in the rechargeable battery upon service interruption of the AC power. Particularly, the rechargeable battery unit comprises a battery state monitoring unit for monitoring a state of the rechargeable battery cells, and communicating means for notifying the electronic device of information indicative of the state of the rechargeable battery detected by the battery state monitoring unit.

Specifically, the rechargeable battery cells comprise nickel-metal hydride rechargeable batteries. The battery state monitoring unit comprises functions of detecting a battery voltage, a charge current and/or a battery temperature of the rechargeable battery cells, determining a fully charged state of the rechargeable battery cells based on the information detected thereby, and calculating a charge capacity and/or a lifetime of the rechargeable battery cells. Then, the communication means is configured to notify the electronic device of at least one of a battery voltage, a battery temperature, a charge current, a discharge current, a battery capacity, a lifetime, the number of discharges, and a replacement time of the rechargeable battery cells, as the information indicative of the state of the rechargeable battery cells.

In a preferred aspect of the present invention, the rechargeable battery unit comprises a charge controller for controlling charging of the rechargeable battery cells in accordance with a battery voltage and/or a battery temperature of the rechargeable battery cells detected by the battery state monitoring unit.

Also, in a preferred aspect of the present invention, the power supply unit comprises a first invertor for converting the AC power supplied from the outside to AC power for driving a primary winding of an insulating transformer, a DC voltage stabilizer circuit for retrieving power from a secondary winding of the insulating transformer to generate a predetermined DC stabilized voltage, a charging unit for retrieving power from a ternary winding of the insulating transformer for use in charging the rechargeable battery cells, and a second invertor for DC/AC converting the power supplied from the rechargeable battery cells for driving the ternary winding.

The rechargeable battery unit comprises a power supply monitoring unit for monitoring a state of the power supply unit.

Further, in a preferred aspect of the present invention, the rechargeable battery unit comprises performance determining means for determining backup performance of the rechargeable battery cells for the electronic device in accordance with a battery temperature of the rechargeable battery cells and the power consumption by the electronic device, and result outputting means for outputting the result of determination. Particularly, the performance determining means is configured to calculate the power consumption by the electronic device from the current value supplied to the electronic device from the power supply unit, and to determine based on the amount of used power and the battery temperature of the rechargeable battery cells whether or not the rechargeable battery cells are capable of supplying the electronic device with backup power which can compensate the operation of the electronic device.

Specifically, the result output means is implemented as a display unit for displaying the result of determination as to the backup performance of the rechargeable battery cells for the electronic device, or notifying means for notifying the electronic device body of the result of determination.

Further, in the uninterruptible power supply according to the present invention, the power supply unit and/or the rechargeable battery unit comprise an alarm function for detecting an interruption of the AC power supplied from the outside to inform the interrupted AC power. The alarm function includes means for informing the interrupted AC power through a visual display and/or rumbling, and resetting means for stopping the information.

Also, the rechargeable battery unit in the uninterruptible power supply according the present invention comprises charge energy detecting means for detecting a charge energy of the rechargeable battery cells, charging/discharging detecting means for detecting a charging/discharging state of the rechargeable battery cells, failure detecting means for detecting a failure of the rechargeable battery cells and/or the power supply unit, charge energy display means for displaying the charge energy of the rechargeable battery cells detected by the charge energy detecting means in multiple stages, charging/discharging display means for displaying the charging/discharging state of the rechargeable battery cells detected by the charging/discharging detecting means, and alarming means for informing a failure detected by the failure detecting means.

The charge energy display means is configured to divide the charge energy of the rechargeable battery cells into n stages (n is a natural number equal to or larger than two), wherein the charge energy display means includes n display segments corresponding to the respective stages, which are selectively driven to display the charge energy in multiple stages. The charging/discharging display means comprises a function of displaying a charging state and a discharging state of the rechargeable battery cells in different display forms, and stops the display when the rechargeable battery cells reach a full charge.

Further, the alarming means is configured to inform a failure of the rechargeable battery cells and/or the power supply unit continuously until a reset instruction is given after detecting the failure. The charge energy detecting means in turn is configured to maintain the same output as that generated when the full charge is detected to drive the charge energy display means even if the charge energy detecting means detects a reduction in the charge energy due to a self discharge of the rechargeable battery cells after the full charge of the rechargeable battery cells has been detected.

In a preferred embodiment of the present invention, the uninterruptible power supply comprises a cooling fan implemented as incorporated in a housing which integrally accommodates the electronic device, the power supply unit, and the rechargeable battery unit for cooling down at least one of the electronic device, the power supply unit and the rechargeable battery unit. The power supply unit or the rechargeable battery unit comprises a fan lifetime detecting function for determining a lifetime or a state of the cooling fan for notification to the electronic device.

The rechargeable battery unit is integrally incorporated and packed in a case which is mounted in a drive bay previously prepared for a peripheral device in the housing, and mounted in the drive bay of the housing for use therein.

The rechargeable battery unit comprises a cooling fan for cooling down the rechargeable battery cells, and a fan controller for controlling the operation of the cooling fan. Particularly, the fan controller is configured to detect the temperature of the rechargeable battery to operate the cooling fan. Further, the fan controller preferably comprises a function for forcedly disabling the cooling fan to operate when the rechargeable battery cells are being charged.

BRIEF DESCRIPTION OF THE DRAWINGS

FIG. 10 is a diagram illustrating another embodiment of the multi-stage display performed by the indicator for indicating a charging/discharging state of the rechargeable battery and a charge energy of the rechargeable battery.

DETAILED DESCRIPTION OF THE INVENTION

In the following, an uninterruptible power supply according to one embodiment of the present invention will be described with reference to the accompanying drawings.

Figure 1:
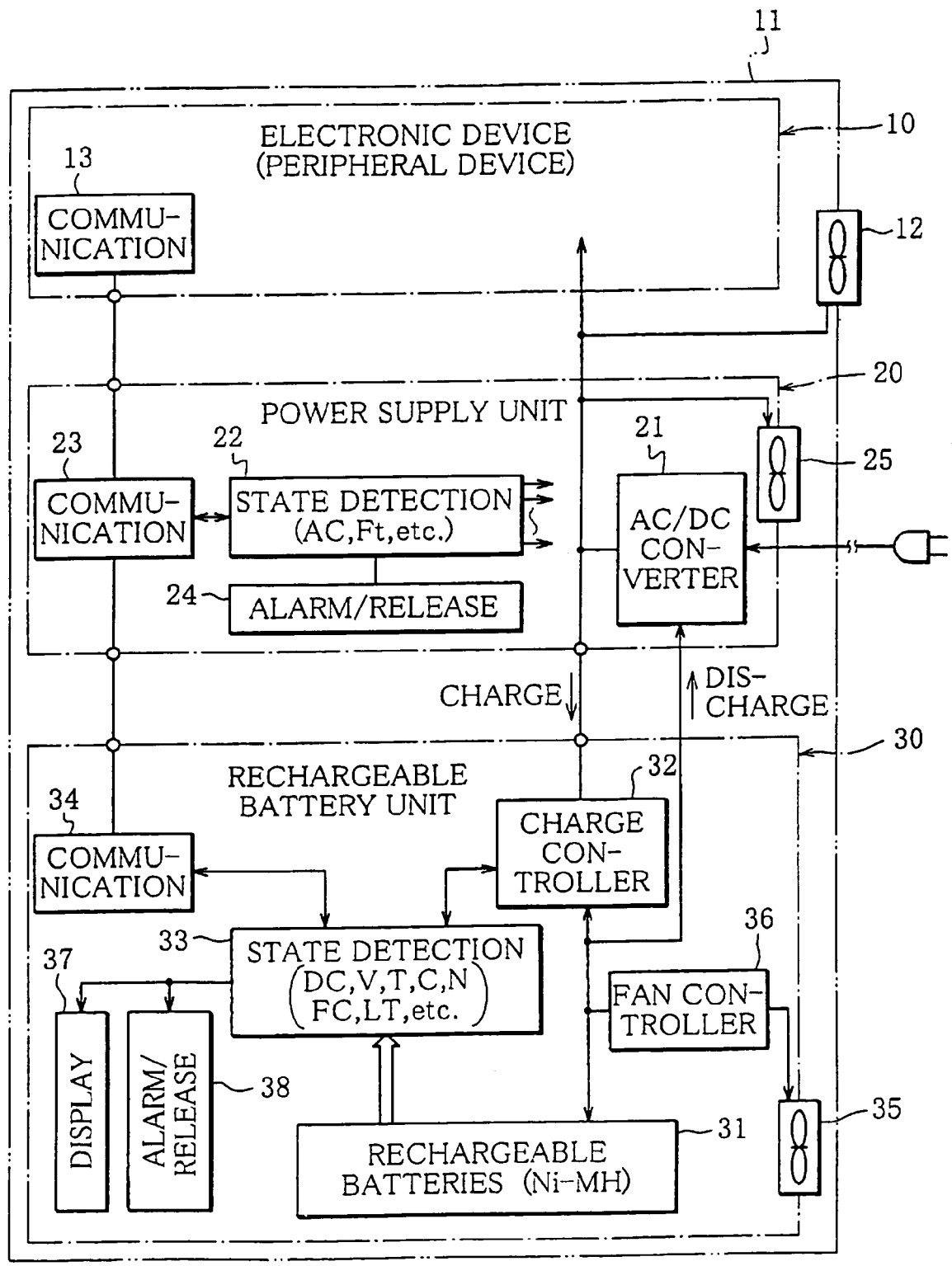
FIG. 1 is a diagram generally illustrating the configuration of an electronic device system which incorporates an uninterruptible power supply according to the present invention.

FIG. 1 generally illustrates the configuration of an electronic device system which incorporates the uninterruptible power supply according to the present invention. In FIG. 1, reference numeral 10 designates an electronic device such as a computer, a server or the like; 20 a power supply unit for converting a commercial power supply (AC power) to DC power for driving the electronic device 10; and 30 a rechargeable battery unit which includes a rechargeable battery for storing the DC power converted by the power supply unit 20 and supplying the stored power to the electronic device 10 upon interruption of the power supplied from the AC power (disconnection and failure).

The power supply unit 20 for driving the electronic device 10 is mainly comprised of an AC/DC converter 21 for converting the commercial power supply (AC power supply) to predetermined DC power. In addition, the power supply unit 20 according to this embodiment comprises a state detector 22 for detecting the operating state of the AC/DC converter 21; and a communication function 23 for notifying the electronic device 10 of state information detected by the state detector 22. The power supply unit 20 further comprises an alarm function 24 operable when the state detector 22 detects a failure of the commercial power supply for notifying to that effect; and a dedicated cooling fan 25 for cooling the AC/DC converter 21 to stabilize the operation thereof.

The state detector 22 examines an input state of the commercial power supply (AC power supply) as the operating state of the AC/DC converter 21 to detect a disconnection of a commercial power supply line and a failure of the commercial power supply. The state detector 22 is also configured to detect an operating time period of the cooling fan 25 from a time period during which the electronic device 10 is supplied with the DC power for determining a time at which the cooling fan 25 should be replaced.

The rechargeable battery unit 30 in turn comprises a rechargeable battery 31 which is basically comprised of a plurality of nickel-metal hydride (Ni-MH) rechargeable batteries connected in series and/or in parallel. The rechargeable battery unit 30 also comprises a charge controller 32 for controlling the charging of the rechargeable battery 31; and a state detector 33 for detecting a charging state of the rechargeable battery 31. The state detector 33 has functions of detecting, for example, a battery voltage V, a battery temperature T, a capacity C, the number of discharges N, a fully charged state FC, a battery lifetime LF, and so on of the rechargeable battery 31. The charge controller 32 in turn controls the charging of the rechargeable battery 31 in accordance with the state of the rechargeable battery 31 detected by the state detector 33. Then, the rechargeable battery unit 30 is responsible for discharging the DC power energy stored in the rechargeable battery 31 to drive the AC/DC converter 21 to supply the electronic device 10 with the DC power when the AC/DC converter 21 stops operating due to a failure of the commercial power supply, and so on.

The rechargeable battery unit 30 also comprises a communication function 34 for communicating data with the electronic device 10. The communication function 34 notifies the electronic device 10, as required, of state information on the rechargeable battery 31 such as the battery voltage V detected by the state detector 33. The rechargeable battery unit 30 further comprises a dedicated cooling fan 35 for cooling the rechargeable battery 31, as described later, and a controller 36 associated therewith. The rechargeable battery unit 30 further comprises a display unit 37 for displaying a charging state of the rechargeable battery 31 and so on, and an alarm function 38 for informing a failure of the commercial power supply (AC power supply) as mentioned above.

Communications of information among the rechargeable battery unit 30, power supply unit 20 and electronic device 10 are made using a communication function 13 built in the electronic device 10 in accordance with communication specifications of, for example, RS-232C. Specifically, a data communication path is formed by sequentially connecting the communication function 13 provided in the electronic device 10, the communication function 23 provided in the power supply unit 20, and the communication function 34 provided in the rechargeable battery unit 30 using RS-232C cables or the like. Then, in accordance with a predetermined data communication procedure, information from the rechargeable battery unit 30, for example, is notified to the electronic device 10 through the power supply unit 20, while information from the power supply unit 20 is also notified to the electronic device 10.

Specifically, information on [power supply temperature], [power], [trouble in fan], [AC interruption signal (failure detection signal], and so on is notified, for example, from the power supply unit 20 to the rechargeable battery unit 30. On the other hand, [battery check signal], [shut-down signal], [connection recognition signal], [battery voltage reduction signal], [AC fail signal], and so on are notified from the rechargeable battery unit 30 to the power supply unit 20 and the electronic device 10.

Alternatively, the communication function 34 of the rechargeable battery unit 30 may be connected to the communication function 13 of the electronic device 10 through an RS-232C cable to directly notify the state information on the rechargeable battery 31 detected in the rechargeable battery unit 30 to the electronic device 10. In this event, the information on the power supply unit 20 may be notified to the electronic device 10 through the rechargeable battery unit 30. Further alternatively, the electronic device 10 may of course communicate independently with the rechargeable battery unit 30 and with the power supply unit 20, respectively.

Then, the electronic device 10 monitors the power supply unit 20 and the rechargeable battery unit 20 for their operating states from the information notified from these power supply unit 20 and rechargeable battery unit 30. The electronic device 10 determines from the result of monitoring whether or not the power supply unit 20 and the rechargeable battery unit 30 are normally functioning, respectively. Also, the electronic device 10 recognizes a failure of the commercial power supply, for example, from the information notified from the power supply unit 20 and the rechargeable battery unit 30 to execute a sequence of data integration processing which involves saving a variety of data expanded in the electronic device 10 in a non-volatile memory within a period in which backup DC power is supplied from the rechargeable battery unit 30.

Figure 2:
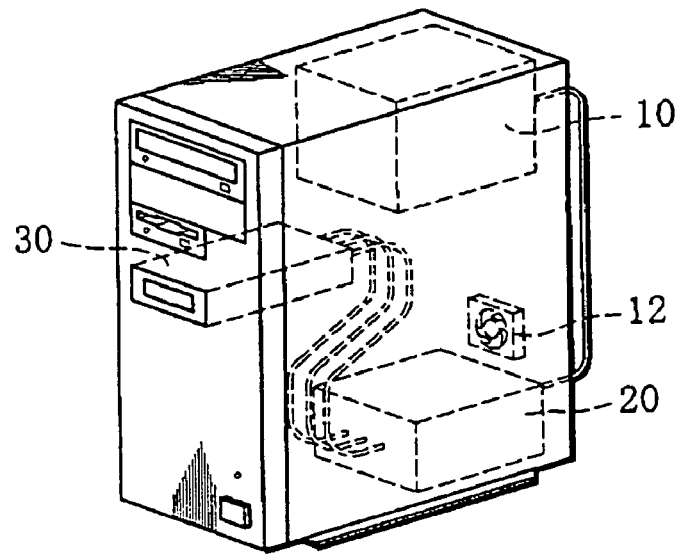
FIG. 2 is a diagram illustrating an example of a housing which integrally accommodates an electronic device, a power supply unit, and a rechargeable battery unit to constitute an electronic device system.

Basically, the electronic device 10 and the power supply unit 20 are integrally incorporated in a housing 11 in a mini-tower type box shape, for example, as illustrated in FIG. 2, to constitute a single electronic device system. A cooling fan 12 is also incorporated in the housing 11, for example, on the back side, such that the cooling fan 12 forcedly circulates air into the housing 11 to cool down the entire electronic device system.

The rechargeable battery unit 30 is incorporated into the housing 11, which forms part of the electronic device system, to be integrated with the electronic device system. Particularly, the rechargeable battery unit 30 is implemented as accommodated in a case having a size which is fitted, for example, into a 3.5-inch drive bay previously provided in the housing 11 for mounting a peripheral device. Thus, the rechargeable battery unit 30 is mounted in the 3.5-inch drive bay for use in the electronic device system.

Figure 3:
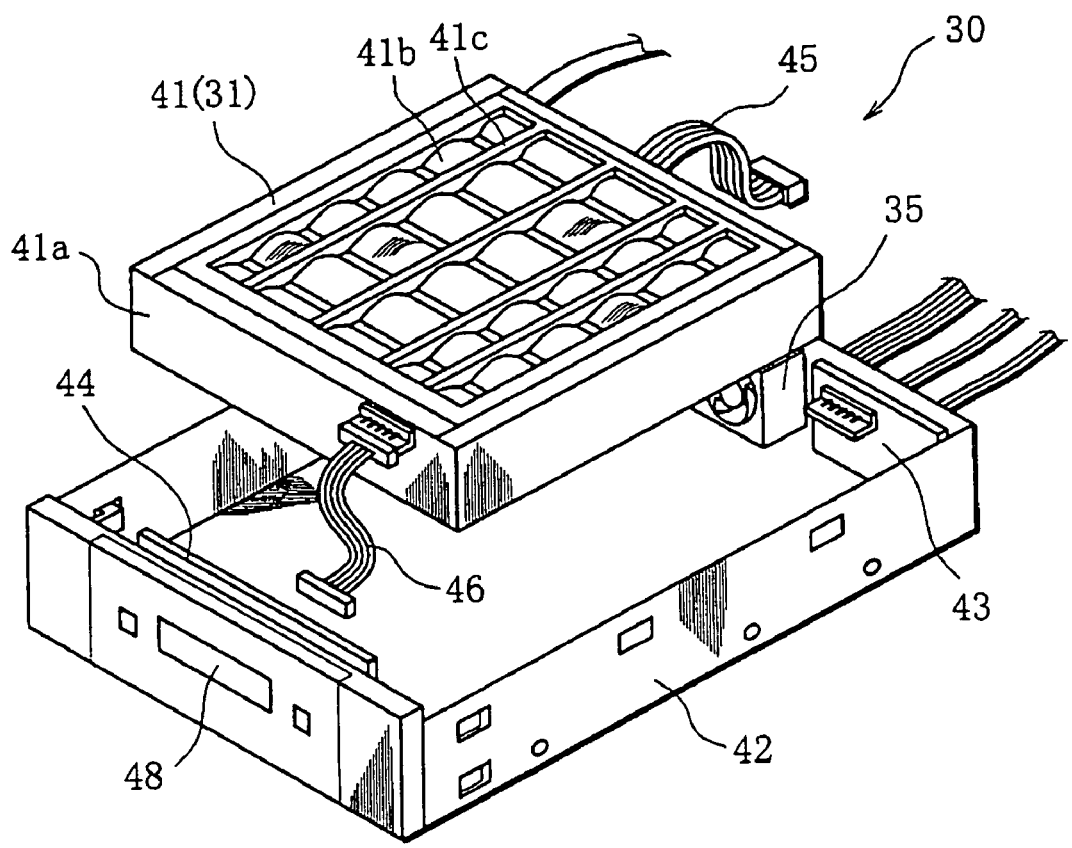
FIG. 3 is a diagram illustrating an outer appearance and structure of the rechargeable battery unit.

Specifically, the rechargeable battery unit 30 has the rechargeable battery 31 comprised of a nickel-metal hydride (Ni-MH) rechargeable battery which is small in size but has a large battery capacity. Particularly, the rechargeable battery unit 30, the structure of which is generally illustrated in FIG. 3, comprises a battery case 41 made, for example, of aluminum having a high thermal conductivity in the shape of flat box, and a plurality of cylindrical nickel-metal hydride rechargeable batteries arranged side by side in the battery case 41 to form a battery pack. The battery case 41, serving as the battery back, is again accommodated in a case 42 which can be mounted in the drive bay of the housing 11. The case 42 is covered with a lid, not shown.

As compared with a lead rechargeable battery of the same class, a nickel-metal hydride rechargeable battery of 12V-3Ah class is superior substantially twice as much in terms of variations in the battery capacity (effective capacity) when it is discharged, for example, from a fully charged state at a constant current of 20 A. In addition, the nickel-metal hydride rechargeable battery of 12V-3Ah class has a higher energy density than the lead rechargeable battery of the same class, and only has a volume substantially ⅕ of the lead rechargeable battery. Therefore, if the rechargeable battery 31 is provided with the backup performance (effective capacity) substantially identical to a conventional lead rechargeable battery, it is sufficient to use a nickel-metal hydride rechargeable battery of 12V-1.5Ah. Furthermore, generally, a nickel-metal hydride rechargeable battery having a volume approximately ⅒ of a lead rechargeable battery can perform a sufficient function as the rechargeable battery 31 for an uninterruptible power supply. Therefore, with the use of the nickel-metal hydride rechargeable batteries for the rechargeable battery 31, the rechargeable battery 31 can be fitted in the case 42 which can be mounted in the drive bay of the housing 11 of the electronic device system.

The rechargeable battery 31 accommodated in the battery case 41 to form a battery pack is removably incorporated in the case 42, and electrically connected to circuit boards 43, 44 previously incorporated in the case 42 through signal cables 45, 46 to constitute the rechargeable battery unit 30.

The case 42 is provided with the aforementioned cooling fan 35 disposed on the back side for circulating air into the case 42 to cool the rechargeable battery 31 particularly through the battery case 41. The cooling fan 35, which is driven under the control of a fan controller 36 incorporated in the circuit board 43 disposed on the back side of the case 42, is selectively driven, for example, when the state detector 33 detects a rise in the battery temperature T. With the provision of the cooling fan 35 as described above, the rechargeable battery unit 30 is controlled with respect to its temperature independently of the aforementioned electronic device 10 and power supply unit 20 to suppress a reluctant temperature rise in the rechargeable battery 31, as described later.

An indicator 48 comprised of LEDs and so on is incorporated in a front panel of the case 42. The indicator 48 is driven for display under the control of a display unit 37 incorporated in the circuit board 44 disposed on the front side of the case 42. The indicator 48 indicates, for example, a charging state of the rechargeable battery 31 detected by the state detector 33, specifically, information such as the battery voltage V and the charge capacity C, as well as a charging/discharging state, the number of discharges and so on. Also, the indicator 48 indicates a power failure under the control of the aforementioned alarm function 38.

In this embodiment, the battery case 41 comprises a box 41a in which a plurality of cylindrical nickel-metal hydride rechargeable batteries are arranged side by side; and a lid 41b provided to cover the top surface of the box 41a. Particularly, the lid 41b is made of aluminum or the like, which has a high thermal conductivity, and has a corrugated shape so that the lid 41b is sequentially brought into close contact with the peripheral surfaces of the plurality of cylindrical nickel-metal hydride rechargeable batteries arranged side by side in the box 41a, thereby increasing a degree of thermal coupling with the nickel-metal hydride rechargeable batteries. The lid 41b is also formed with a plurality of parallel partition plates (heat dissipating fins) 41c protruding from the top surface of the lid 41b. In this event, the bottom surface of the box 41a may be in a similar shape to the lid 41b.

In this way, the cooling fan 35 efficiently cools down the nickel-metal hydride rechargeable batteries through the lid 41b by circulating the air onto the top surface of the lid 41b along the partition plates 41c, in cooperation with the structure of the aforementioned battery case 41. Though not particularly illustrated, the circuit board which incorporates the state detector 33 is accommodated in the battery case 41 together with the nickel-metal hydride batteries in the form of battery pack.

In the embodiment illustrated in FIG. 3, the signal cables 45, 46 are coupled between the battery case 41 and the circuit boards 43, 44, respectively, through connectors. Alternatively, these signal cables 45, 46 may be directly led from the battery case 41 such that they are connected only to the circuit boards 43, 44 through connectors. Also, though not particularly illustrated, the battery case 41 may of course be connected directly to the circuit boards 43, 44 through connectors without using the signal cables 45, 46.

The compact rechargeable battery unit 30, having the rechargeable battery 31 and so on integrally incorporated in the box-shaped case 42, is incorporated in the housing 11 utilizing an empty 3.5-inch drive bay in the housing 11 described above. Then, by connecting a predetermined power supply cable led from the rechargeable battery 31 in the rechargeable battery unit 30 internally to charge/recharge power supply terminals of the power supply unit 20, the rechargeable battery unit 30 is integrated into the electronic device system which is comprised of the electronic device 10 and the power supply unit 20.

When the housing 11 has no empty drive bay, the rechargeable battery unit 30 may be mounted, for example, in a region for adding a hard disk drive within the housing 11, thereby incorporated into the electronic device for use therewith. However, if the region for adding a hard disk drive has been filled with an added hard disk drive, the rechargeable battery unit 30 may be attached external to the housing 11. Even in such a configuration, the electronic device 10 is notified of information indicative of the operating states of the power supply unit 20 and the rechargeable battery unit 30 by interconnecting the electronic device 10, power supply unit 20 and rechargeable battery unit 30 through RS-232C cables.

Figure 4:
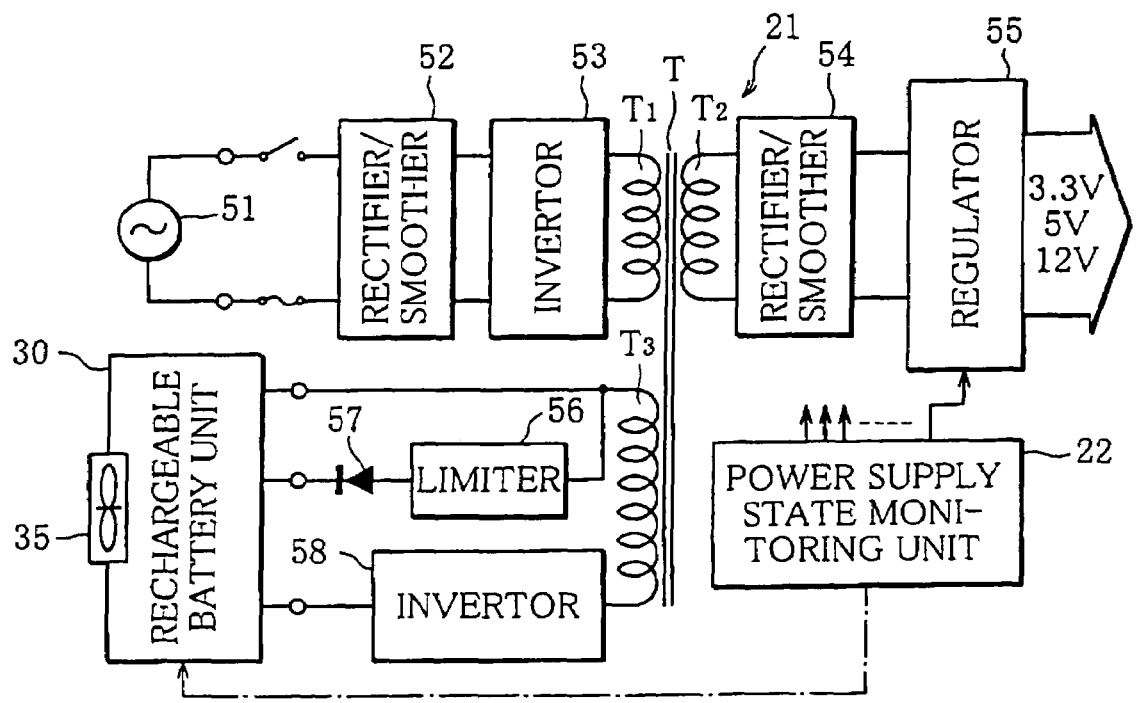
FIG. 4 is a diagram illustrating an exemplary configuration of an AC/DC converter in the power supply unit.

Now describing in greater detail the AC/DC converter 21 incorporated in the power supply unit 20, the AC/DC converter 21 is configured, for example, as illustrated in FIG. 4. Specifically, the AC/DC converter 21 comprises a rectifier/smoother circuit 52 for rectifying and smoothing the commercial power supply (AC power) 51; and a first invertor circuit 53 for converting the output (DC) of the rectifier/smoother circuit 2 to AC power for driving a primary winding T1 of an insulating transformer T. Then, the power generated in a secondary winding T2 of the insulating transformer T resulting from the primary winding T1 driven by the first invertor circuit 53 is rectified and smoothed by a rectifier/smoother circuit 54, and applied to a regulator 55 which generates from the output of the rectifier/smoother circuit 54 three DC stabilized voltages consisting, for example, of 3.3 V, 5 V and 12V. These stabilized DC voltages are supplied to the electronic device 10.

The insulating transformer T also comprises a ternary winding T3. The power generated in the ternary winding T3 resulting from the primary winding T1 driven by the first invertor circuit 53 is retrieved from a limiter 56 for limiting a charge current through a diode 57, and output to the rechargeable battery unit 30 as the power for charging the rechargeable battery 31.

The AC/DC converter 21 also comprises a second invertor circuit 58 for driving the ternary winding T3. The second invertor circuit 58 serves to convert the power supplied from the rechargeable battery 31 in the rechargeable battery unit 30 to AC power for driving the ternary winding T3 when the first invertor 53 stops operating due to a failure of the commercial power supply 51 or the like. The ternary winding T3 is thus driven by the second invertor circuit 58 to generate power in the secondary winding T2 similar to that which is generated when the first winding T1 is driven by the first invertor circuit 53. As a result, the regulator 55 receives the power from the rechargeable battery 31 to generate and output a predetermined stabilized DC voltage when the commercial power supply 51 fails.

The power supply unit 20 comprises a power supply state monitoring unit (state detector) 22 for detecting the operating states of respective components in the power supply unit 20, represented by the regulator 55, for example, the values of the stabilized DC voltages, an output voltage of the rectifier/smoother circuit 52, and so on to monitor their operating states. Information on the state of the power supply unit 20 detected by the power supply state monitoring unit 22 is notified to the rechargeable battery unit 30 and the electronic device 10, respectively, as described above.

Figure 5:
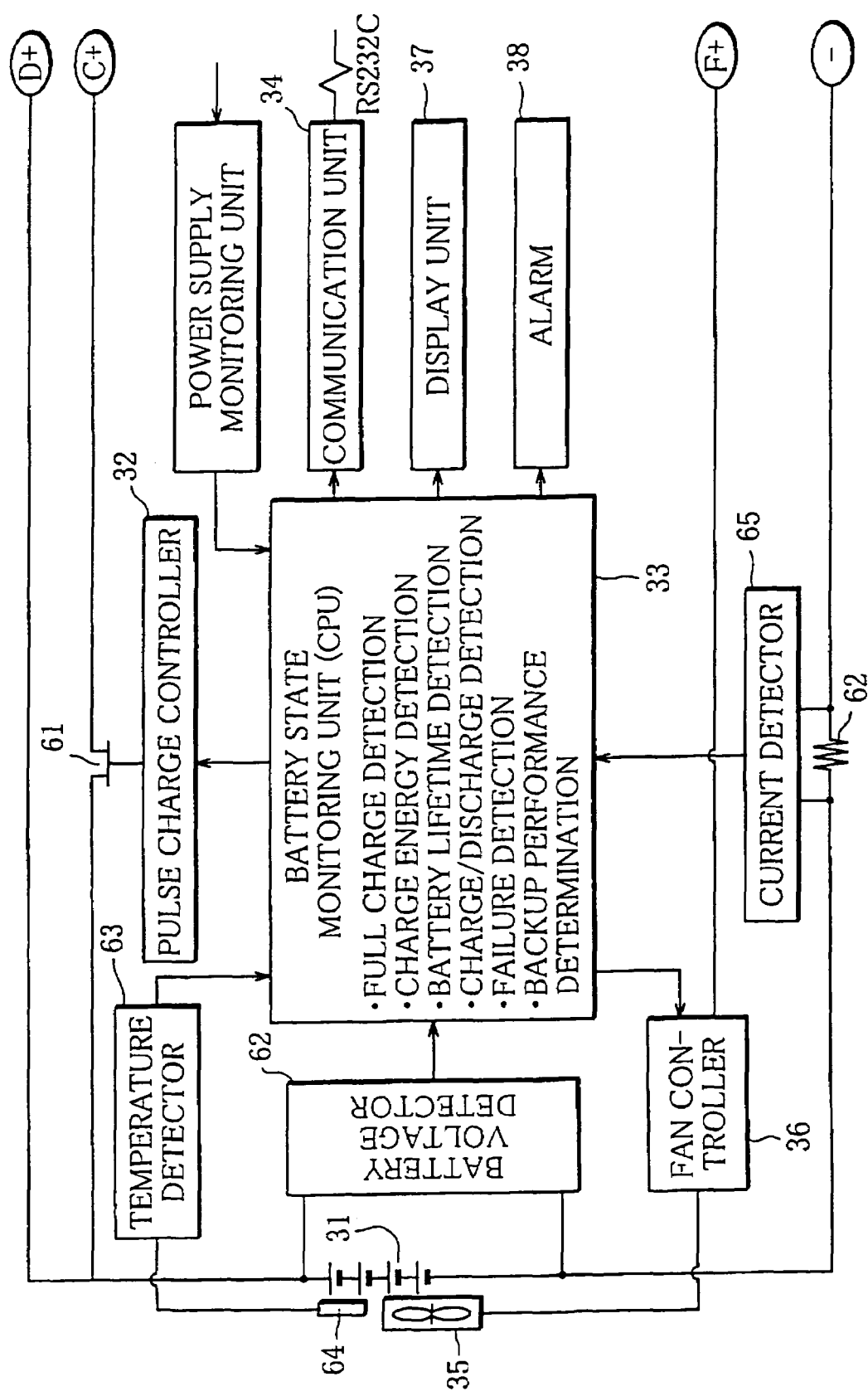
FIG. 5 is a diagram generally illustrating the configuration of the rechargeable battery unit.

For the AC/DC converter 21 configured as described above, the rechargeable battery unit 30 is configured, for example, as illustrated in FIG. 5. Specifically, a positive terminal of the rechargeable battery 31 comprised of a plurality of serially connected battery cells is connected to a discharge terminal [D+] as well as to a charge terminal [C+] through a switching element (FET) 61 for charge control. A negative terminal of the rechargeable battery 31 is connected to a negative terminal [−] common to charging and discharging through a current detecting resistor 62.

The discharge terminal [D+] is connected to one end of the ternary winding T3 in the power supply unit 20, while the charge terminal [C+] is connected to the limiter 56 through the diode 57. The negative terminal [−] is connected to the invertor 58 in the AC/DC converter 21. Then, the rechargeable battery 31 is charged by controlling the switching element (FET) 61 to apply the rechargeable battery 31 with a pulsed voltage applied between the charge terminal [C+] and the negative terminal [−] through a connection to the ternary winding T3 of the insulating transformer T. The power stored in the rechargeable battery 31 is discharged through the discharge terminal [D+] and the negative terminal [−]. The power discharged from the rechargeable battery 31 is switched under the control of the invertor 58 in the AC/DC converter 21 to be intermittently supplied to the ternary winding T3, thereby driving the ternary winding T3.

The rechargeable battery unit 30 for controlling the charging and discharging of the rechargeable battery 31 comprises a battery voltage detector 62 for detecting a battery voltage of the rechargeable battery 31, and a temperature detector 63 for detecting the temperature of the rechargeable battery 31. The battery voltage detector 62 has a function of detecting the battery voltage across the entire rechargeable battery 31. The temperature detector 63 in turn is responsible for detecting the temperature of the rechargeable battery 31 (battery temperature) using a temperature sensor 64 adhered to a peripheral surface of the rechargeable battery 31. The rechargeable battery unit 30 also comprises a current detector 65 for detecting a charge/discharge current of the rechargeable battery 31 from a voltage drop generated across both ends of the resistor 62 interposed in series with a charge/discharge path of the rechargeable battery 31 as described above, and for distinguishing a charging state from a discharging state for the rechargeable battery 31 from the polarity of the voltage drop.

The battery state monitoring unit (state detector) 33, for example, comprised of a CPU, which is a main component of the controller in the rechargeable battery unit 30 monitors the state of the rechargeable battery 31 from the battery voltage V detected by the battery voltage detector 62; the battery temperature T detected by the temperature detector 63; the charge/discharge current I detected by the current detector 65; and so on. The battery state monitoring unit (state detector) 33 further controls the charging and discharging of the rechargeable battery 31 in accordance with a charging state and discharging state of the rechargeable battery 31 in a manner described below.

Specifically, the battery state monitoring unit 33 monitors whether or not the rechargeable battery 31 has reached the fully charged state from the battery voltage and battery temperature (full charge detecting function). Then, the battery state monitoring unit 33 controls the pulse charge controller 32 to drive the switching element (FET) 61 to charge the rechargeable battery 31 in a pulsatile manner until the full charge of the rechargeable battery 31 is detected. Also, when the rechargeable battery 31 has been fully charged, the battery state monitoring unit 33 stops charging the rechargeable battery 31 to prevent the same from being overcharged.

Employed for controlling the charging of the rechargeable battery 31 is an approach of detecting, for example, a peak value of the battery voltage (peak value detecting method), or an approach of detecting a decrease of the battery voltage from the peak value by a predetermined voltage (−ΔV method) to stop charging the rechargeable battery 31. Also employed as appropriate is a method of detecting the battery temperature reaching a predetermined value, taking advantage of the fact that the voltage temperature rises as the battery is charged (TCO method); a method of detecting a rise in the battery temperature from a predetermined temperature by a preset temperature (ΔT method); or a method of detecting a rising rate of the battery temperature per unit time (ΔT/Δt method) to stop charging the rechargeable battery 31.

In this event, if the charge energy of the rechargeable battery 31 is reduced due to a self discharge after the battery state monitoring unit 33 detects the full charge to stop charging the rechargeable battery 31, the rechargeable battery 31 may of course be charged again or intermittently charged under the control of the battery state monitoring unit 33.

The battery state monitoring unit 33 also detects the charge energy of the rechargeable battery 31 from the battery voltage and charge current detected as described above, while controlling the charging of the rechargeable battery 31 in the foregoing manner (charge energy detecting function). The battery state monitoring unit 33 further calculates the battery lifetime from an internal resistance of the rechargeable battery 31 (battery lifetime detecting function). Specifically, the battery state monitoring unit 33 finds the internal resistance of the rechargeable battery 31, for example, from a battery voltage Von of the rechargeable battery 31 immediately before the charge path for the rechargeable battery is shut off, and an open battery voltage Voff of the rechargeable battery 31 after the charging path has been shut off. Then, the battery lifetime is calculated based on a close correspondence relationship between the internal resistance and the lifetime of the rechargeable battery 31.

The lifetime of the rechargeable battery 31 may be managed, for example, by counting the number N of discharges of the rechargeable battery 31, and regarding the number N of discharges as the number of repeated charges and discharges. When the number of repeated charges and discharges has reached a predetermined control value, the battery state monitoring unit 33 outputs a message for prompting the user to replace the rechargeable battery 31 through the display unit 37, assuming that the lifetime of the rechargeable battery 31 is about to expire, or notifies the electronic device 10 to that effect. By providing such a function, it is possible to avoid using the rechargeable battery 31 as it is after the lifetime has expired.

In addition, the battery state monitoring unit 33 has a function of detecting information on anomalous battery temperature of the rechargeable battery 31, and a function of monitoring an anomalous state of the power supply unit 20 through the power supply monitoring unit 66. The charge energy and charging/discharging state of the rechargeable battery 31 detected by the battery state monitoring unit 33 are displayed on the display unit 37, and an alarm is generated using an alarm 38 when a fault is detected.

The battery state monitoring unit 33 further comprises a backup performance determining function for determining whether or not the operation of the electronic device 10 can be ensured for a predetermined time period using the power energy stored in the rechargeable battery 31 when the commercial power supply 51 fails, as described later. The backup performance determining function is implemented by comparing the power energy stored in the rechargeable battery 31 with the electric energy required to drive the electronic device 10 for the predetermined time period, for example, in accordance with the battery temperature of the rechargeable battery 31 detected by the temperature detector 63, and the power consumption in the electronic device 10 found by the power supply state monitoring unit 22 in the power supply unit 20.

Specifically, the backup performance determining function operates when the power supply unit 20 receives the commercial power supply 1 to supply the electronic device 10 with the driving power (during a normal operation) to detect the power consumption by the electronic device 10 (power consumption) from the current value of a stabilized power supply fed to the electronic device 10 from the power supply unit 20, or a current output from the invertor 53. Then, the backup performance determining function basically determines the backup performance by calculating a time period during which the electronic device 10 can be supplied with backup power from the rechargeable battery unit 30 in accordance with the power consumption by the electronic device 10, and the electric energy which can be supplied from the rechargeable battery 31 to the electronic device 10 (charge capacity).

Specifically, this determination is practically made by comparing the amount of backup power (current value) which can be supplied from the rechargeable battery 31 for the predetermined time period, which can be previously calculated in accordance with the charge capacity (maximum charge capacity) in the fully charged state of the rechargeable battery 31, with the power consumption by the electronic device 10. The power consumption by the electronic device 10 may be calculated as the amount of used power at a current time. Alternatively, since the amount of used power varies depending on how the electronic device 10 is used, the power consumption by the electronic device 10 may be calculated, for example, as an average value of the amount of used power over a predetermined time period, as a maximum value of the same, or the like.

Moreover, from the fact that the electric energy which can be supplied from the rechargeable battery 31 varies in accordance with battery characteristics which depend on the battery temperature, and is reduced as the battery performance is degraded particularly at a low temperature, the backup performance determining function corrects the amount of backup power which can be supplied from the rechargeable battery 31 for the predetermined time period in accordance with the battery temperature detected in the temperature detector 63. In this way, the determination is made in consideration of the battery temperature by comparing the corrected electric energy with the power consumption by the electronic device 10.

Furthermore, from the fact that the battery temperature further rises due to internally generated heat caused by a discharge when the rechargeable battery 31 is heated beyond a temperature below which the battery characteristics are guaranteed, the backup performance determining function assumes that the amount of backup power which can be supplied from the rechargeable battery 31 is zero when the battery temperature of the rechargeable battery 31 exceeds the guaranteed temperature.

Figure 6:
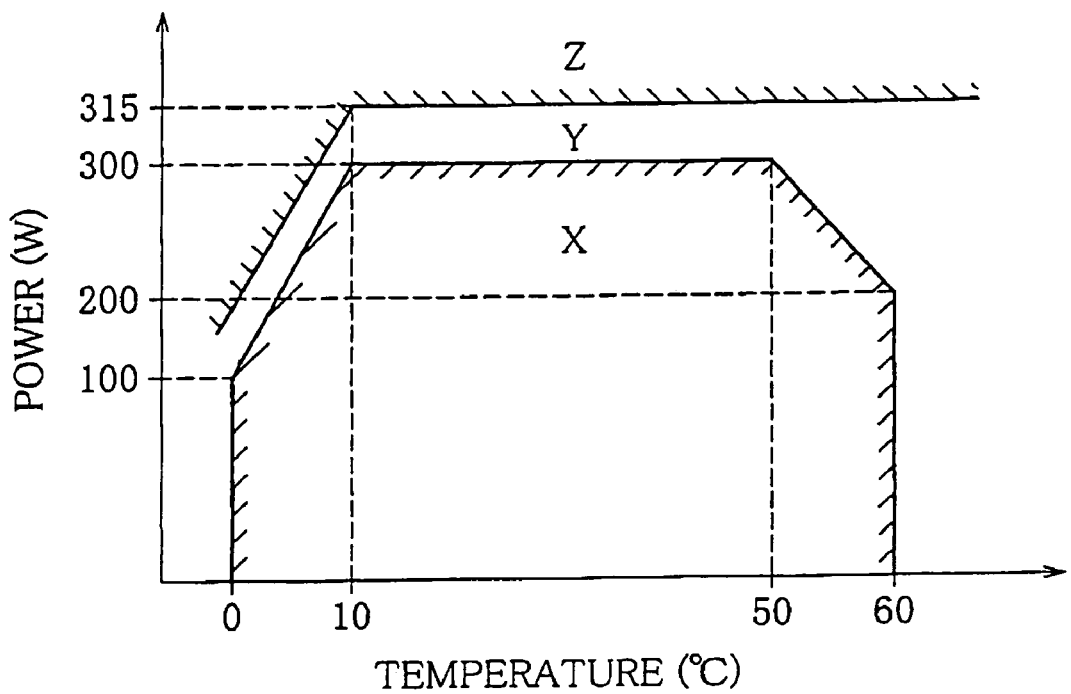
FIG. 6 is a graph showing the criteria for determining the backup performance of a rechargeable battery.

Specifically, the backup performance determining function relies on determination criteria which have been set, for example, as shown in FIG. 6 to determine whether the rechargeable battery 31 provides sufficient backup performance for the electronic device 10 [in a determination region X]; whether the backup performance is slightly insufficient [in a determination region Y]; or whether the backup performance is insufficient [in a determination region Z] in accordance with the battery temperature detected in the temperature detector 63, and a standard power consumption by the electronic device 10. Particularly, in this example, though depending on the chargeable power capacity of the rechargeable battery 31, the backup performance determining function determines that the electronic device 10 is beyond a limit below which the rechargeable battery 31 can guarantee the operation of the electronic device 10 upon power failure, for example, when the standard power consumption by the electronic device 10 is 315 W or more [in the determination region Z], and determines that the rechargeable battery 31 can guarantee the operation of the electronic device 10 only when the standard power consumption by the electronic device 10 is 300 W or less [in the determination region X].

In addition, the backup performance determining function determines that the rechargeable battery 31 cannot guarantee the operation of the electronic device 10 even if the standard power consumption by the electronic device 10 is 300 W or less when the battery voltage of the rechargeable battery 31 is below 10° C. or above 50° C., in addition to the aforementioned determination criteria. Furthermore, the backup performance determining function determines that the rechargeable battery 31 cannot guarantee the operation of the electronic device 10 when the battery temperature is above 60° C.

The backup performance determining function displays the result of determination as described, for example, on the display unit 37, or notifies the electronic device 10 of the result of determination through the communication function 34, thereby outputting information as to whether or not the rechargeable battery 31 is capable of sufficiently implementing the role of uninterruptible power supply.

Upon receipt of the notice from the rechargeable battery unit 30, for example, the electronic device 10 displays in accordance with the contents of the notice that a backup framework has been established for a power failure by displaying a predetermined icon for displaying the backup power supply function in [green] or the like, for example, when the backup performance has been sufficiently ensured by the rechargeable battery 31 [in the determination region X]. On the other hand, when the backup performance by the rechargeable battery 31 is slightly insufficient [in the determination region Y], the electronic device 10 displays the icon for displaying the backup power supply function in [orange] or the like to draw attention of the user to the backup framework for a power failure. Then, when the backup performance of the rechargeable battery 31 is completely insufficient [in the determination region Z], the electronic device 10 displays the icon for displaying the backup power supply function in [red] or the like to warn about the backup framework for a power failure.

By providing the function of determining the backup performance of the rechargeable battery 31, it is precisely determined whether or not the rechargeable battery 31 can really back up the electronic device 10 upon power failure in accordance with the power consumption by the electronic device 10 intended for the backup even if the rechargeable battery 31 has been charged in a fully charged state. Then, the result of determination is notified to the electronic device 10 or the operator, thereby making it possible to precisely understand the backup performance provided by the uninterruptible power supply in the electronic device 10. Also, the backup performance of the rechargeable battery 31 is determined in consideration of the battery temperature, so that, for example, if insufficient backup performance is displayed although the backup performance is sufficiently ensured in a normal operation, the electronic device 10 can assume that the uninterruptible power supply has failed, or that a load on the electronic device 10 is unusually (reluctantly) being increased. Therefore, advantageously, an appropriate countermeasure can be taken before a power failure. In other words, the backup performance provided by the rechargeable battery 31 (uninterruptible power supply) can be precisely monitored on the electronic device 10.

The battery state monitoring unit 33 drives the fan controller 36 in accordance with the battery temperature of the rechargeable battery 31. The fan controller 36 is responsible for operating the cooling fan 35 to cool down the rechargeable battery 31 when the battery temperature of the rechargeable battery 31 exceeds a predetermined control temperature, and for stopping operating the cooling fan 31 when the battery temperature is below the control temperature or another control temperature lower than this control temperature. By thus maintaining the battery temperature of the rechargeable battery 31 substantially constant, the rechargeable battery 31 is prevented from being exposed to a high battery temperature for a long time period, and as a result, its battery characteristics are obviated from being largely deteriorated.

However, as the cooling fan 35 is operated to prevent the rechargeable battery 31 from being heated, the battery temperature does not easily rise when charged, causing a sluggish change in the battery voltage, resulting in a possible delay in the charging control, possible inability of the charging control itself to effectively work, and so on.

Figure 7:
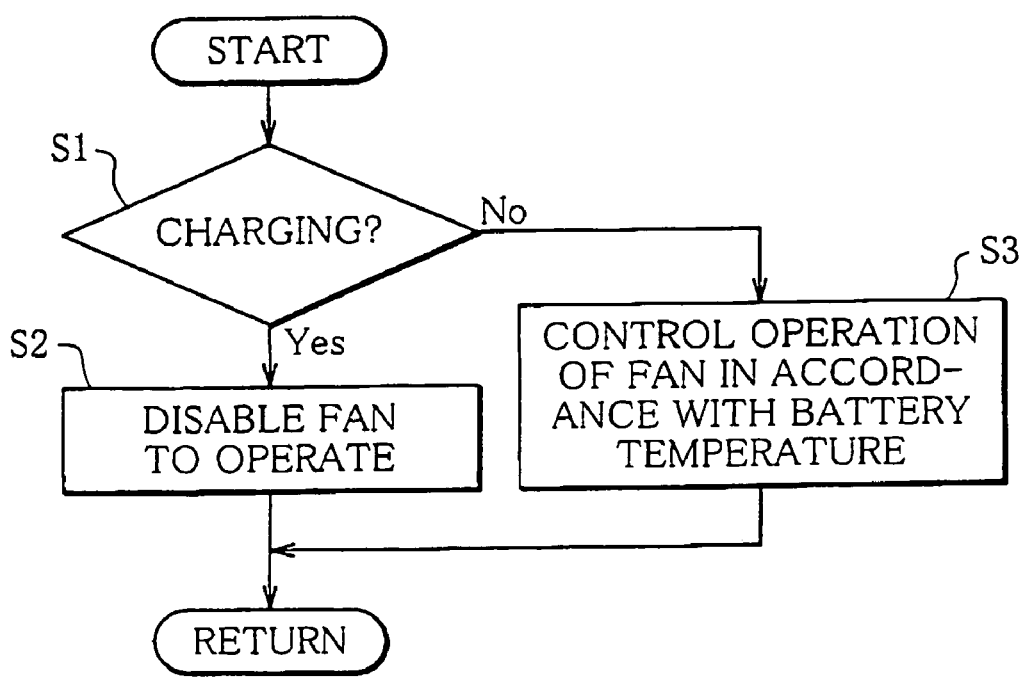
FIG. 7 is a diagram illustrating a procedure for controlling a cooling fan incorporated in the rechargeable battery unit.

To avoid such inconveniences, the fan controller 36 has a function of forcedly disabling the operation of the cooling fan 35 while the rechargeable battery 31 is being charged. Specifically, referring, for example, to a general flow of processing control illustrated in FIG. 7, the fan controller 26 determines, for example, from the result of monitoring made by the battery state monitoring unit 33 whether or not the rechargeable battery 31 is being charged [step S1]. The fan controller 35 stops operating the cooling fan 35 [step S2] when the rechargeable battery 31 is being charged. The cooling fan 35 is disabled to operate, for example, by breaking a power supply line for driving the fan, supplied from the power supply unit 20. The fan controller 26 executes the operational control for the cooling fan 25 only when the rechargeable battery 31 is not being charged [step S3]

By providing the fun control function as described above, the rechargeable battery 31 will not be forcedly cooled down while it is being charged since the cooling fan 35 is disabled to operate under the control of the fan controller 36. Therefore, the charge voltage and battery voltage of the rechargeable battery 31 change as the rechargeable battery 31 is charged more, and present behaviors conforming to the charge energy. For this reason, the battery state monitoring unit 33 can precisely monitor the charging state of the rechargeable battery 31 to reliably perform the charge control (for stopping the charging when the rechargeable battery 31 is fully charged) without delay.

Even if the battery temperature of the rechargeable battery 31 rises due to the influence of its surrounding environment, changes in the battery voltage and battery temperature from the start of charging exhibit behaviors conforming to the charge energy, thereby making it possible to detect the fully charged state and stop charging the rechargeable battery 31 without fail. Also, even if the operation of the cooling fan 35 is forcedly stopped in this way while the rechargeable battery 31 is being charged, the charging is generally completed within a predetermined time period, so that the rechargeable battery 31 is unlikely to be exposed to a high temperature state for a long time period. Therefore, even with the dedicated cooling fan 35 for cooling down the rechargeable battery 31, the rechargeable battery 31 can be stably charged while eliminating the influence of the cooling fan 35.

Figures 8, 9:
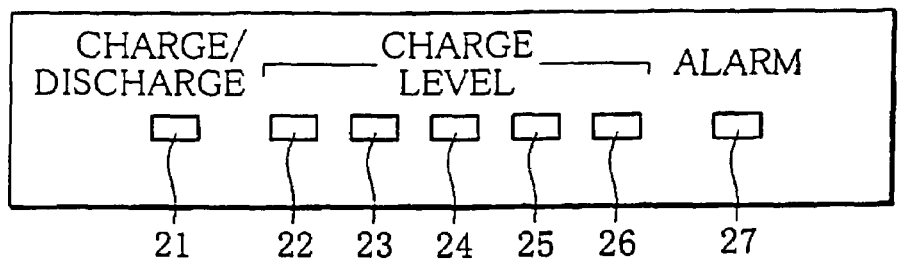
FIG. 8 is a diagram illustrating an example of a display arranged on a panel surface of the housing of the uninterruptible power supply.
FIG. 9 is a diagram illustrating one form of multi-stage display, performed by an indicator composed of a plurality of light emitting diodes for indicating a charging/discharging state of a rechargeable battery, and a charge energy of the rechargeable battery.

The rechargeable battery unit 30 comprises the indicator 48 on the front surface of the case 42 illustrated in FIG. 3, which is driven for display under the control of the display unit 37 incorporated in the circuit board 44. For example, as illustrated in FIG. 8, the indicator 48 comprises a light emitting diode (LED) 71 for displaying a charging/discharging state of the rechargeable battery 31; five light emitting diodes 72, 73, 74, 75, 76 for displaying the charge energy of the rechargeable battery 31 in multiple stages; and a light emitting diode 77 for displaying a failure in the rechargeable battery 31. The display unit 37 selectively lights (blinks) these light emitting diodes 71, 72 to 76, 77 in accordance with the state of the rechargeable battery 31 detected by the battery state monitoring unit 33 to display the state of the rechargeable battery 31, specifically, a charging/discharging state of the rechargeable battery 31, the charge energy, and the presence or absence of a failure.

The five light emitting diodes 72, 73, 74, 75, 76 for displaying the charge energy of the rechargeable battery 31 in multiple stages serve to display the charge energy Cap of the rechargeable battery 31, for example, in five stages in increments of 20%, with the fully charged state being indicated as 100%. A two-color light emitting diode may be used, for example, for the light emitting diode (LED) 71 for displaying the charging/discharging state of the rechargeable battery 31, such that the light emitting diode 71 is driven to emit light in different colors in a charging state and in a discharging state. Thus, the state of the rechargeable battery 31 is precisely displayed in a readily understandable manner by the light emitting diode 71 which displays the charging/discharging state of the rechargeable battery 31, and the light emitting diodes 72 to 76 which display the charge energy of the rechargeable battery 31.

Specifically, the seven light emitting diodes 71, 72 to 76, 77 are driven to display the state of the rechargeable battery 31, for example, as illustrated in FIG. 9. In other words, the light emitting diode 71 is controlled to light in a different color depending on whether the rechargeable battery 31 is being charged or discharged. For example, when charged, the light emitting diode 71 is displayed in green to indicate "under charging" and is stopped lighting upon completion of the charging. On the other hand, when the rechargeable battery 31 is being discharged, the light emitting diode 71 is displayed in red to indicate "under discharging."

Then, when being discharged, in accordance with the charge energy of the rechargeable battery 31, the light emitting diode 72 alone is driven to light when the charge energy Cap of the rechargeable battery 31 is 20% or less; the two light emitting diodes 72, 73 are driven to light when the charge energy Cap exceeds 20% and is equal to or less than 40%; the three light emitting diodes 72, 73, 74 are driven to light when the charge energy Cap exceeds 40% and is equal to or less than 60%; and the four light emitting diodes 72, 73, 74, 75 are driven to light when the charge energy Cap exceeds 60% and is equal to or less than 80%. When the charge energy Cap exceeds 80%, all of the five light emitting diodes 72 to 76 are driven to light.

When all of the five light emitting diodes 72 to 76 are lit in this way, it is determined whether the rechargeable battery 31 is being charged or has been charged depending on whether or not the light emitting diode 71 indicative of the charging/discharging state is lit. When discharged, the respective light emitting diodes 72, 76 are selectively lit in accordance with the charge energy Cap. In this event, however, the light emitting diode 71 indicative of the charging/discharging state is driven in a different manner from that when charged, so that it is determined from the lighting state of the light emitting diode 71 that the rechargeable battery 31 is being discharged.

As the battery state monitoring unit 33 detects the fully charged rechargeable battery 31, the rechargeable battery 31 is controlled to stop charging, as described above. However, the rechargeable battery 31 is charged again when its charge energy is reduced to a predetermined value due to a self discharge after it has been fully charged. In this event, the battery state monitoring unit 33 is desirably configured to apply the same signal to the charge energy display circuit and so on as that which is applied when the full charge is detected, even if it detects a reduction in the charge energy due to the self discharge of the rechargeable battery 31. Particularly, when the charge energy of the rechargeable battery 31 is notified to the electronic device 10 through the communication unit 34, a notification of a reduction in the charge energy of the rechargeable battery 31 due to the self discharge after full charge would cause unnecessary anxiety on the monitoring side. It is therefore preferable that after detecting the full charge, the charge energy is locally compensated for in the rechargeable battery 31 without notifying the electronic device 10 of such a reduction in the charge energy due to the self discharge of the rechargeable battery 31.

Consequently, as the charge energy Cap of the rechargeable battery 31 is displayed using the light emitting diodes 72 to 76 while the charging/discharging state of the rechargeable battery 31 is displayed using the light emitting diode 71 in the foregoing manner, the state of the rechargeable battery 31 can be readily and precisely understood only by viewing the lighting (display) states of the light emitting diodes (display segments) 71 to 76. It is also possible to readily confirm whether or not the uninterruptible power supply is normally functioning. Also, in this event, when the light emitting diode 77 is lit to inform a failure of the rechargeable battery 31, the failure can be known certainly, so that rapid countermeasures can be taken.

Particularly, the uninterruptible power supply, unlike that which powers the electronic device 10 at all times from the rechargeable battery 31, powers the electronic device 10 in place of the power supply unit 20 only at the time of a failure In which the power supplied to the electronic device 10 is interrupted from the power supply unit 20. It is therefore difficult to confirm whether or not the charging function of the rechargeable battery 31 is normally working simply by displaying the charge energy of the rechargeable battery 31. In this respect, according to the rechargeable battery unit 30 which comprises a display segment (light emitting diode 71) dedicated to the display of the charging/discharging state, it can be immediately known from the lit light emitting diode 71 that the charging of the rechargeable battery 31 has been started at the time the rechargeable battery 30 is installed, thereby making it possible to readily and precisely confirm the function of the uninterruptible power supply. Particularly, after the rechargeable battery 31 has been fully charged, the light emitting diode 71 is unlit to indicate that the rechargeable battery 31 is not in the charging/discharging state, and the light emitting diodes 72 to 76 are all lit to indicate that the rechargeable battery 31 can back up the electronic device 10, thereby precisely showing that the rechargeable battery 31 is normally functioning.

Alternatively, the light emitting diodes 72 to 76 for displaying the discharge amount in multiple stages may be driven in different manners when charged and when discharged as illustrated in FIG. 10. Specifically, the light emitting diodes 72 to 76 indicative of the battery capacity (charge energy) Cap are blinked when discharged to more clearly display that the rechargeable battery 31 is being discharged. In this event, since the dedicated display segment (light emitting diode 71) for displaying the charging/discharging state likewise indicates that the rechargeable battery 31 is being discharged, the blinking light emitting diodes 72 to 76 will not be misunderstood.

Also, in this event, the charge energy Cap may be displayed by the light emitting diodes 72 to 76 when charged such that light emitting diodes indicative of the level to which the rechargeable battery 31 has been charged, for example, are lit, while a light emitting diode corresponding to a level to which the rechargeable battery 31 is now being charged is blinked. In other words, a light emitting diode indicative of a level corresponding to the charge energy Cap may be blinked, while light emitting diodes corresponded to levels lower than that (charge energy) may be continuously lit. Such a display form, if employed, allows a range of the previously reached charge energy Cap to be distinguished from a range of the charge energy Cap currently being charged, thereby making it possible to more precisely know the charge energy Cap.

As described above, the rechargeable battery unit 30 configured to have a function of detecting the state of the rechargeable battery 31, a communication function, and a display function provides the following advantages. Specifically, since a drive bay of the housing 11 in which the electronic device 10 and the power supply unit 20 are accommodated is utilized to incorporate the rechargeable battery 30 for integration with the electronic device, significant simplification of the entire system configuration, and a reduction in space for installation can be achieved. In addition, since the indicator 48 is provided on the front surface of the case 42 in the rechargeable battery unit 30 to display an operating state of the rechargeable battery unit 30 and hence a charging state of the rechargeable battery 31, the operating state of the rechargeable battery unit 30 can be confirmed and understood in a field at which the electronic device is handled. It is therefore possible to monitor without fail a failure of the commercial power supply, a failure of the power supply unit 20, and so on from the operating state of the rechargeable battery unit 30.

Also, from the operation of the alarm function 38 incorporated in the rechargeable battery 30, it is possible to readily know without fail troubles such as a failure of the commercial power supply, breakage of an associated power supply line, and so on. Particularly, even when a plurality of electronic devices are used as placed side by side, it is possible to precisely find out that a failure has occurred in a power supply line of which electronic device, and take countermeasures thereto.

Further, since the rechargeable battery unit 30 itself comprises the cooling fan 35 for cooling down the rechargeable battery 31 and operates the cooling fan 35 independently of the electronic device 10 and the power supply unit 20., it is possible to obviate the battery characteristics from deteriorating due to a reluctant rise in temperature of the rechargeable battery 31. Therefore, practically significant advantages are provided such as the ability to securely guarantee the operation of the electronic device 10 driven by the power supply unit 20 while simply and effectively guaranteeing the operational characteristics of the rechargeable battery unit 30.

Moreover, since the power supply unit 20 itself also comprises the alarm function 24, it is easy to precisely find out that a failure has occurred in a power supply line of which electronic device of a plurality of electronic devices. Particularly, since the electronic device 10 is notified of the operating state of the rechargeable battery unit 30 and the operating state of the power supply unit 20 through the communication functions 34, 23, the electronic device 10 can execute predetermined processing operations while keeping track of the operating states of the rechargeable battery unit 30 and the power supply unit 20 at all times, thereby making it possible to rapidly perform data integration processing and so on upon power failure of the commercial power supply and so on.

When the rechargeable battery unit 30 or the battery unit 20 fails, the electronic device 10 can generate an alarm utilizing its own self-diagnosis function to rapidly prompt for its repair, replacement of the rechargeable battery 31, and so on, thereby making it possible to readily ensure a stable operating environment at all times.

If the electronic device 10 is notified of information for prompting for replacement of the rechargeable battery 31, for example, when a deterioration of the battery characteristics of the rechargeable battery 31 is found in a determination of the lifetime of the rechargeable battery 31 made by the state detector 33 relying on a change in the internal resistance of the rechargeable battery, the number of discharges, and so on, the electronic device 10 which serves as an interface with a manager (user) can positively prompt the manager (user) to replace the rechargeable battery 31. Thus, the rechargeable battery 31 can be replaced with a new one before the rechargeable battery 31 experiences deteriorated battery characteristics and loses the function (role) of the rechargeable battery unit 30, thereby readily achieving the integration of function.

For the reasons set forth above, by providing a communication function for notifying the state of the rechargeable battery 31 in the rechargeable battery unit 30 and so on, practically significant advantages can be provided, such as the ability to achieve the integration of functions for the entire system including the rechargeable battery unit 30 and the power supply unit 20, while precisely keeping track of the operating state of the system under the management of the electronic device 10 to readily and effectively ensure a stable operation of the electronic device 10.

The alarm generator 19 may display an anomalous operation of the fan for cooling down the rechargeable battery 31 and an anomalous operation of the power supply unit 20. In addition, when the generator 19 generates an alarm indicative of a failure, the generator 19 preferably generates the alarm intermittently until a manager or the like, who has confirmed the failure, rests the alarm. Otherwise, the present invention can be modified in various ways in practice without departing from the gist thereof.

What is claimed is:

1. An uninterruptible power supply comprising:
    a power supply unit configured to generate DC power at a predetermined voltage from AC power supplied from outside, and to supply the DC power to an electronic device; and
    a rechargeable battery unit including rechargeable battery cells configured to store the power supplied thereto from said power supply unit for supplying said electronic device with the power stored in said rechargeable battery upon service interruption of said AC power,
    wherein said rechargeable battery unit comprises:
        a battery state monitoring unit configured to monitor a lifetime of said rechargeable battery cells, and
        communicating means for notifying said electronic device of information indicative of the lifetime of said rechargeable battery detected by said battery state monitoring unit.

2. The uninterruptible power supply according to claim 1, wherein:
    said battery state monitoring unit comprises functions of detecting a battery voltage of said rechargeable battery cells and calculating the lifetime of said rechargeable battery cells based on the battery voltage detected thereby.

3. The uninterruptible power supply according to claim 1, wherein:
    said communication means further notifies said electronic device of at least one of a battery voltage, a battery temperature, a charge current, a discharge current, a battery capacity, the number of discharges, and a replacement time of said rechargeable battery cells, as information indicative of the state of said rechargeable battery cells.

4. The uninterruptible power supply according to claim 1, wherein:
    said rechargeable battery unit comprises a charge controller configured to control charging of said rechargeable battery cells in accordance with at least one of a battery voltage and a battery temperature of said rechargeable battery cells detected by said battery state monitoring unit.

5. The uninterruptible power supply according to claim 1, wherein:
said rechargeable battery unit comprises a power supply monitoring unit configured to monitor a state of said power supply unit.

6. The uninterruptible power supply according to claim 1, wherein:
at least one of said power supply unit and said rechargeable battery unit comprises an alarm function for detecting an interruption of the AC power supplied from the outside to inform the interrupted AC power.

7. The uninterruptible power supply according to claim 6, wherein:
said alarm function includes means for informing the interrupted AC power through at least one of a visual display and a rumbling.

8. The uninterruptible power supply according to claim 1, further comprising:
a cooling fan incorporated in a housing which integrally accommodates said electronic device, said power supply unit, and said rechargeable battery unit, and configured to cool down at least one of said electronic device, said power supply unit, and said rechargeable battery unit, and
wherein said power supply unit comprises a fan lifetime detecting function for determining one of a lifetime and a state of said cooling fan for notification of said electronic device.

9. The uninterruptible power supply according to claim 8, wherein:
said rechargeable battery unit is integrally incorporated and packed in a case which is mounted in a drive bay previously prepared for a peripheral device in said housing, and mounted in said drive bay of said housing for use therein.

10. The uninterruptible power supply according to claim 1, wherein:
said rechargeable battery unit comprises a cooling fan configured to cool down said rechargeable battery cells, and a fan controller configured to control the operation of said cooling fan.

11. The uninterruptible power supply according to claim 1, wherein:
said battery state monitoring unit comprises a function of calculating a lifetime of said rechargeable battery cells based on the number of discharges of said rechargeable battery cells.

* * * * *